United States Patent Office 3,733,254
Patented May 15, 1973

3,733,254
METHOD OF PREPARING d-13β-ETHYLGONA-1,3,5(10)-TRIENE-2,16α,17β-TRIOL
George C. Buzby, Jr., Philadelphia, and George Greenspan, Narberth, Pa., assignors to American Home Products Corporation, New York, N.Y.
No Drawing. Filed Feb. 22, 1971, Ser. No. 117,783
Int. Cl. C07c 167/00
U.S. Cl. 195—51 C                                   1 Claim

ABSTRACT OF THE DISCLOSURE

The preparation of d-13β-ethylgona-1,3,5(10)-triene-3,16α,17β-triol by contacting d-13β-ethylgona-1,3,5(10)-triene-3,17β-diol with *Bacillus megaterium* under aerobic fermentation conditions is reported. This compound is useful as an impeded estrogen in treating infertility due to anovulation.

---

This invention relates to the oxidation of steroids and more specifically to the microbiological 16α-hydroxylation of d-13β-ethylgona-1,3,5(10)-triene-3,17β-diol.

According to the method of the present invention, it has now been found possible to introduce specifically a hydroxyl group at the 16-position of d-13β-ethylgona-1,3,5(10)-triene-3,17β-diol. More specifically, the hydroxyl group is introduced only in the α-configuration.

The invention sought to be patented resides in the concept of subjecting d-13β-ethylgona-1,3,5(10)-triene-3,17β-diol to the biological activity of a selected microorganism species. The fermentative action of the selected species of microorganism of the present invention, namely *Bacillus megaterium* (hereinafter referred to as *B. megaterium*), makes possible the production of d-13β-ethylgona-1,3,5(10)-triene-3,16α,17β-triol, by a procedure superior to any now known to those skilled in the art of organic chemistry. Thus, a method is now provided for obtaining d-13β-ethylgona-1,3,5(10)-triene-3,16α,17β-triol from a source not previously utilizable for such preparation by other than a long and tedious procedure which is uneconomical in both time and materials.

The new method of the present invention and the product obtainable thereby is illustratively represented by the following reaction sequence:

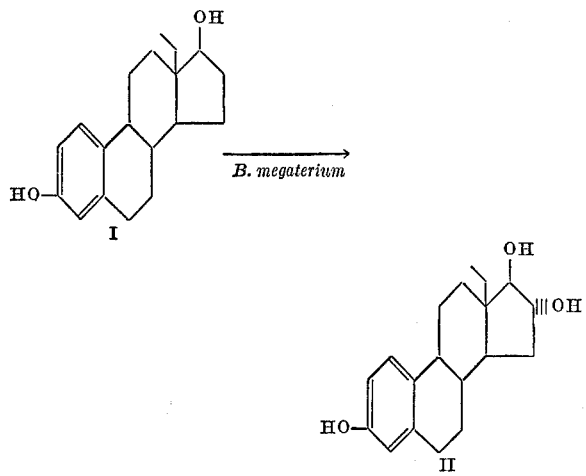

wherein both compounds I and II are understood to be of the d-(natural) configuration.

The desired growth of the selected microorganism, *B. megaterium*, utilized in the process of this invention, is accomplished under aerobic conditions in a suitable nutrient medium broth containing carbohydrate, organic nitrogen and inorganic salts in accordance with well-known technique. The nutrient medium employed may be a yeast extract-dextrose medium, casein hydrolysate, corn steep liquor, water extract of soybean oil meal or lactalbumin hydrolysate together with an appropriate carbon source. The steroid starting material is dissolved or suspended in a solvent such as ethanol, acetone or any other water-miscible solvent which is non-toxic toward the organism, and added to the cultivated microorganism in a broth medium under sterile conditions. This culture is then shaken, aerated or simultaneously aerated and agitated, in order to enhance the growth of the microorganism and the biochemical oxidation of the steroid substrate. The steroid may be added to the culture medium followed by inoculation with the bacterium, or it may be more desirable to obtain substantial growth of the microorganism before the addition of the steroid.

The optimum temperature for growth of the selected microorganism and thus the optimum temperature for practicing the method of the present invention is 28° C., but the temperature may vary between 25° and 37° C., and even between 20° and 40° C. without adversely affecting the microorganism or the microbiological transformation, if the higher temperature is not maintained over excessive periods of time.

The time of reaction may vary from as little as 3 hours to as much as 120 hours, the optimal reaction time being about 24 hours. Preferred solvents are ethanol and acetone, either of which may be used in such amounts that the initial concentration of these solvents in the reaction mixture is no higher than about 7% and, owing to evaporation, the final concentration of the organic solvent may be substantially zero.

Recovery of the desired product is preferably accomplished by extraction with a suitable water immiscible solvent followed by any of the commonly used procedures practiced in the art of steroid recovery including chromatography, fractional crystallization, counter-current distribution and the like. For extraction of the steroid product, chlorinated lower hydrocarbons, ketones or ethers may be used. Particularly suitable solvents are chloroform, methylene chloride, diethylether, diethylketone, methyl isobutyl ketone and the like.

The compound of Formula II, d-13β-ethylgona-1,3,5 (10)-triene-3,16α,17β-triol, possesses pharmacologic activity as an impeded estrogen, thus indicating its usefulness for the treatment of infertility due to anovulation.

A better understanding of the method of the present invention and the manner in which the same may be carried out will be apparent by reference to the following example:

EXAMPLE 1

Four agar slants of *B. megaterium* NRRL B-938 were washed with 5 ml. of distilled water, and the cell suspensions were transferred to four one liter flasks each containing 200 ml. of medium of the following composition:

|                     | G./l. |
|---------------------|-------|
| NZ Case (Sheffield) | 20    |
| Peptone (Difco)     | 20    |
| Dextrose            | 20    |

Distilled water, 1000 ml.

Following 24 hours of growth on a rotary shaker at 28°, the contents of the four flasks were transferred to a 14 liter fermentor with eight liters of the medium described previously. Agitation was set at 200 r.p.m. and aeration at 8 liters air/min. Thirty minutes later, the agitation was increased to 250 r.p.m. After six hours of incubation, 1.6 g. of d-13β-ethylgona-1,3,5(10)-triene-3,17β-diol, dissolved in 80 ml. of ethanol was added to the fermentor.

The fermentation, 7.9 l., was harvested 24 hours after addition of the steroid. Solvent extraction was carried out with four liters of ether. The combined extracts were washed with sodium bicarbonate solution and dried with anhydrous sodium sulfate. After filtration and removal of the solvent the residue was dissolved in 95% ethanol treated with Nuchar filtered and reduced to a low volume. On standing at −10° overnight, the crude solid product was filtered to provide 0.640 g., M.P. 234–237° C. This solid was recrystallized from ethanol to provide pure d(+) - 13β - ethylgona - 1,3,5(10) - triene-3,16α,17β-triol ethanolate, 0.470 g., M.P. 248–251° C. $[\alpha]_D^{24} = +28°$ (c.=2, dioxane).

Analysis for $C_{19}H_{26}O_3 \cdot C_2H_5OH$. Calculated (percent): C, 72.38; H, 9.26. Found (percent): C, 72.53; H, 9.19.

We claim:
1. A method of producing d-13β-ethylgona-1,3,5(10)-triene-3,16α,17β-triol which comprises subjecting d-13β-ethylgona-1,3,5(10)-triene-3,17β-diol to the action of *Bacillus megaterium* under areobic conditions.

References Cited

UNITED STATES PATENTS 3,226,404  12/1965  Sax et al. _____ 195—51 C

OTHER REFERENCES

Kita et al.: Nature, vol. 190, pages 627–628 (1961).

ALVIN E. TANENHOLTZ, Primary Examiner